(12) United States Patent
Chen

(10) Patent No.: US 8,206,018 B2
(45) Date of Patent: Jun. 26, 2012

(54) WATER JET GUIDED LASER DEVICE HAVING LIGHT GUIDE PIPE

(75) Inventor: Hsiang-Hung Chen, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 382 days.

(21) Appl. No.: 12/627,016

(22) Filed: Nov. 30, 2009

(65) Prior Publication Data
US 2010/0226135 A1 Sep. 9, 2010

(30) Foreign Application Priority Data
Mar. 4, 2009 (CN) .......................... 2009 1 0300688

(51) Int. Cl.
*F21V 8/00* (2006.01)
*H01S 3/00* (2006.01)

(52) U.S. Cl. .................. 362/553; 362/610; 219/121.67; 219/121.84; 372/35

(58) Field of Classification Search .................. 362/96, 362/101, 318, 253, 294, 373, 264, 610, 551, 362/553; 219/121.6, 121.67, 121.71, 121.72, 219/121.84; 408/701; 372/35
See application file for complete search history.

(56) References Cited

U.S. PATENT DOCUMENTS

| | | | |
|---|---|---|---|
| 6,696,666 B2 * | 2/2004 | Merdan et al. | 219/121.7 |
| 2005/0092725 A1 * | 5/2005 | Byrd | 219/121.85 |
| 2009/0212020 A1 * | 8/2009 | Mayer et al. | 216/94 |
| 2010/0213166 A1 * | 8/2010 | Kray et al. | 216/37 |

* cited by examiner

*Primary Examiner* — Thomas Sember
(74) *Attorney, Agent, or Firm* — Altis Law Group, Inc.

(57) ABSTRACT

An exemplary water jet guided laser device includes a water-ejecting device and a hollow light guide pipe. The water-ejecting device has a water chamber, a light incident through hole and a water-ejecting through hole defined at opposite sides thereof. The light incident through hole and the water-ejecting through hole are in communication with the water chamber. The water-ejecting device is configured for ejecting water from the water chamber through the water-ejecting through hole. The light incident through hole is configured for introducing a laser beam in the water chamber. The hollow light guide pipe is mounted in the water chamber and aligned with the light incident through hole and the water-ejecting through hole. The light guide pipe is watertight and is configured for receiving and guiding the laser beam from the light incident through hole to the water-ejecting through hole.

14 Claims, 3 Drawing Sheets

WATER JET GUIDED LASER DEVICE HAVING LIGHT GUIDE PIPE

BACKGROUND

1. Technical Field

The present disclosure relates to water jet guided laser devices having light guide pipes.

2. Description of Related Art

Water jet guided laser is a cutting technology that employs a laser beam which is completely reflected at a water-air interface. A water jet guided laser device typically includes a water-container defining a water chamber therein. The laser beam is propagated through the water chamber and then emitted from the water-container and finally guided by a water jet to a workpiece.

However, because partial energy of the laser beam is absorbed by water in the water chamber, this will decrease intensity of the laser beam striking the workpiece. Thus, work efficiency of the laser beam is low.

Therefore, there is a need for a water jet guided laser device in which the limitations described are eliminated or at least alleviated.

DETAILED DESCRIPTION

Figure 1:
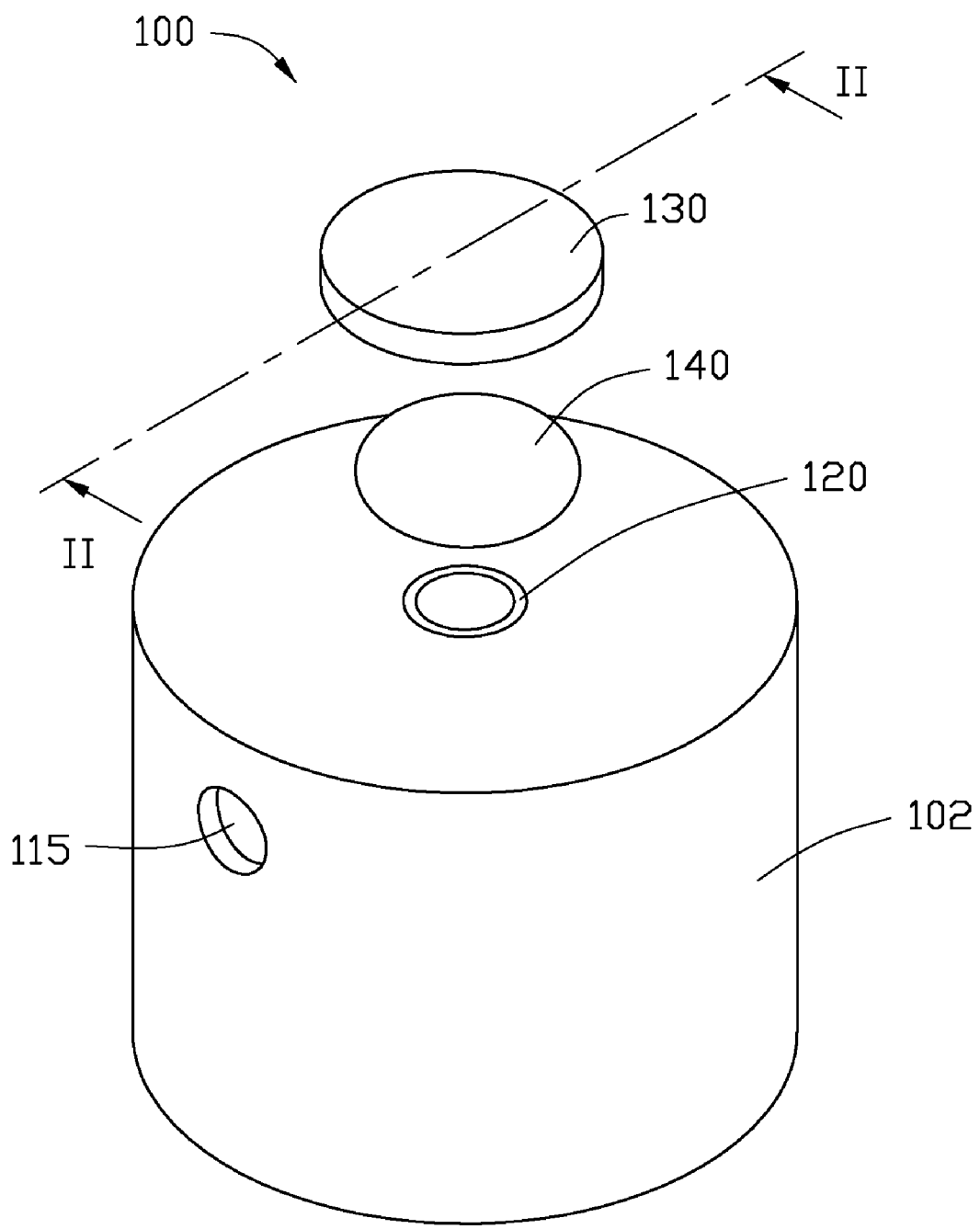
FIG. 1 is an isometric and schematic view of a water jet guided laser device, according to a first exemplary embodiment.
Figure 2:
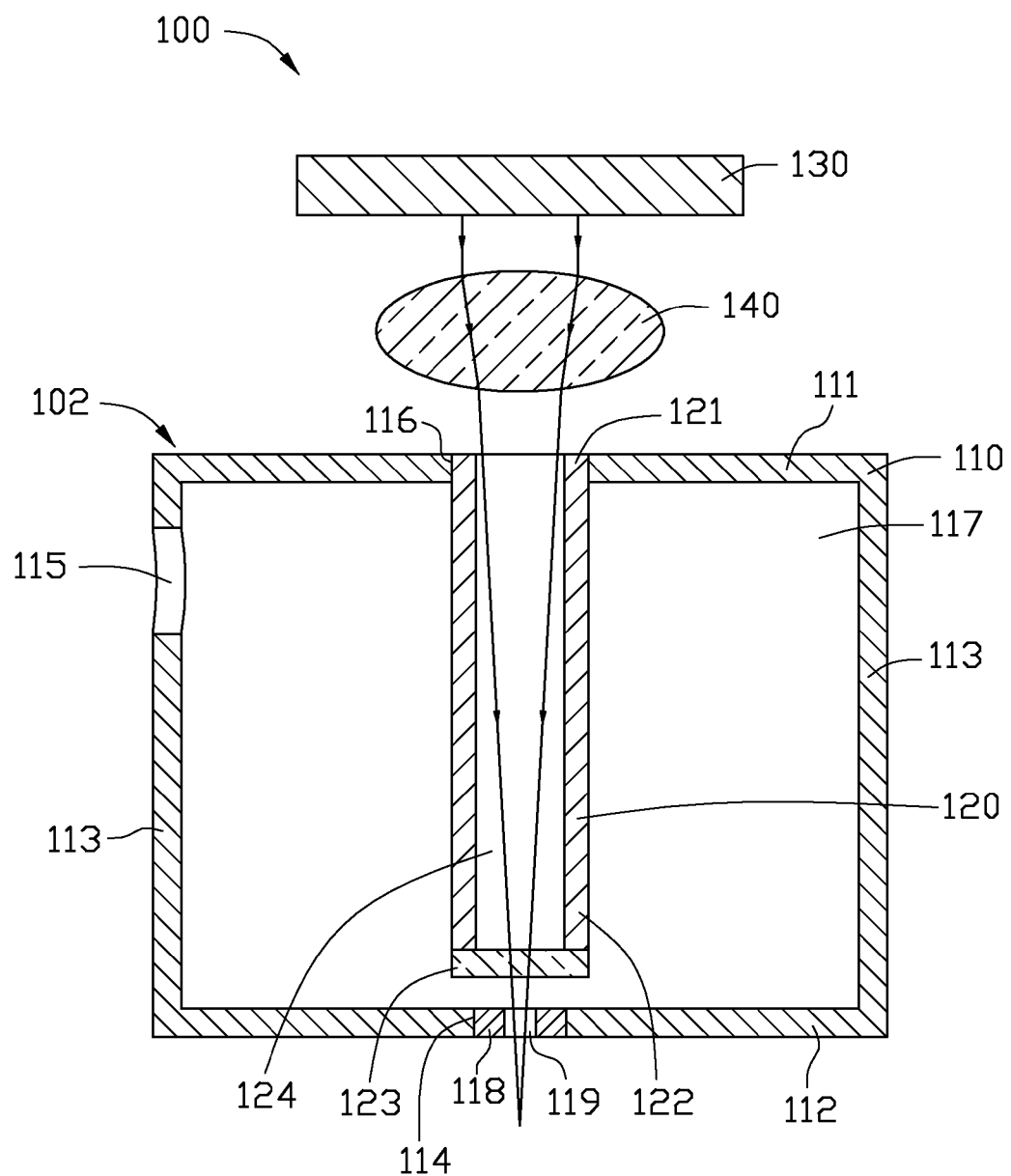
FIG. 2 is a sectional view taken along line II-II of the water jet guided laser device of FIG. 1.

Referring to FIGS. 1 and 2, a water jet guided laser device 100, according to a first exemplary embodiment, includes a water-ejecting device 102, a light guide pipe 120, a laser source 130, and a converging lens 140.

In this embodiment, the water-ejecting device 102 includes a container 110 and a nozzle 118. The container 110 is made from metal or alloy. The container 110 is substantially a hollow cylinder in this embodiment. The container 110 includes a cylindrical sidewall 113, an upper wall 111, and a lower wall 112 formed at opposite sides of the cylindrical sidewall 113. The cylindrical sidewall 113, the upper wall 111 and the lower wall 112 cooperatively define a water chamber 117. The water chamber 117 is configured for receiving water. Beneficially, the water is de-ionized filtered water. The cylindrical sidewall 113 includes an inlet 115 arranged therethrough. The inlet 115 is configured for introducing the water into the water chamber 117. The inlet 115 may be connected to a water feeding device (not illustrated).

The upper wall 111 has a light incident through hole 116 defined in a center thereof. The lower wall 112 has a lower through hole 114 defined in a center thereof. The light incident through hole 116 is aligned with the lower through hole 114. The light incident through hole 116 and the lower through hole 114 are in communication with the water chamber 117. The light guide pipe 120 is mounted in the water chamber 117 and is aligned with the light incident through hole 116. The nozzle 118 is fixedly received in the lower through hole 114. The light guide pipe 120 is aligned with the nozzle 118.

The nozzle 118 has a water-ejecting through hole 119 defined therein. The water-ejecting through hole 119 is in communication with the water chamber 117 and is configured for ejecting water from the water chamber 117 to form a water jet. The water-ejecting through hole 119 is aligned with the light guide pipe 120. The water jet is shaped as a thin cylinder and works as a light-fiber for guiding laser beams. A diameter of the water-ejecting through hole 119 is smaller than that of the inlet 115. In this embodiment, a diameter of the water-ejecting through hole 119 is about 30 micrometers to about 2 millimeters. The nozzle 118 may be made from diamond or sapphire for greater mechanical strength and a long usage life.

The light guide pipe 120 is a cylindrical pipe. A outer diameter of the light guide pipe 120 is slightly smaller than a diameter of the light incident through hole 116 so that the light guide pipe 120 is fixedly mounted in the water chamber 117 at the light incident through hole 116. Length of the light guide pipe 120 is shorter than a distance between the upper wall 111 and the lower wall 112. The light guide pipe 120 is made from polymethylmethacrylate.

The light guide pipe 120 is a hollow pipe and has a light guide chamber 124 defined therein. The light guide pipe 120 includes a first end 121 and a second end 122 at opposite sides thereof. The first end 121 is open and is coupled to the light incident through hole 116. The second end 122 separately faces the lower wall 112 and spaced from the water-ejecting through hole 119. A transparent plate 123 is water-tightly attached to an end surface of the second end 122 to prevent water from entering the light guide pipe 120. The transparent plate 123 may be a glass plate. A distance between the transparent plate 123 and the nozzle 118 is about 1 millimeter to about 1 centimeter.

The laser source 130 is configured for emitting a laser beam toward the converging lens 140. The converging lens 140 is positioned between the laser source 130 and the upper wall 111 of the container 110. The converging lens 140 is configured for converging and directing the laser beam to the light guide pipe 120. An optical axis of the converging lens 140 is aligned with a central axis of the light guide pipe 120. The converged laser beam is propagated in the light guide pipe 120 from the first end 121 to the second end 122 and emitted from the water-ejecting through hole 119. Thus, length of a light path of the laser beam travelling in the water is decreased. A workpiece (not shown) may be positioned outside the container 110 facing the nozzle 118. The converged laser beam is guided by the water jet to strike the workpiece. The laser source 130 and the converging lens 140 may be fixed by some suitable fixing means.

When in use, the water-ejecting through hole 119 is sealed by some suitable sealing means, such as a plastic plug, the water is introduced into the water chamber 117 through the inlet 115. When the water is full of the water chamber 117, the water-ejecting through hole 119 is open, and the water jet is formed. The laser beam is converged and directed by the converging lens 140 to the light guide pipe 120 and is propagated to the nozzle 118 and guided inside the water jet by total reflection at a water-air interface to the workpiece.

Because the length of the light path of the laser beam travelling in the water is decreased, intensity of the laser beam striking the workpiece can be enhanced. Thus, work efficiency of the laser beam increases.

Figure 3:
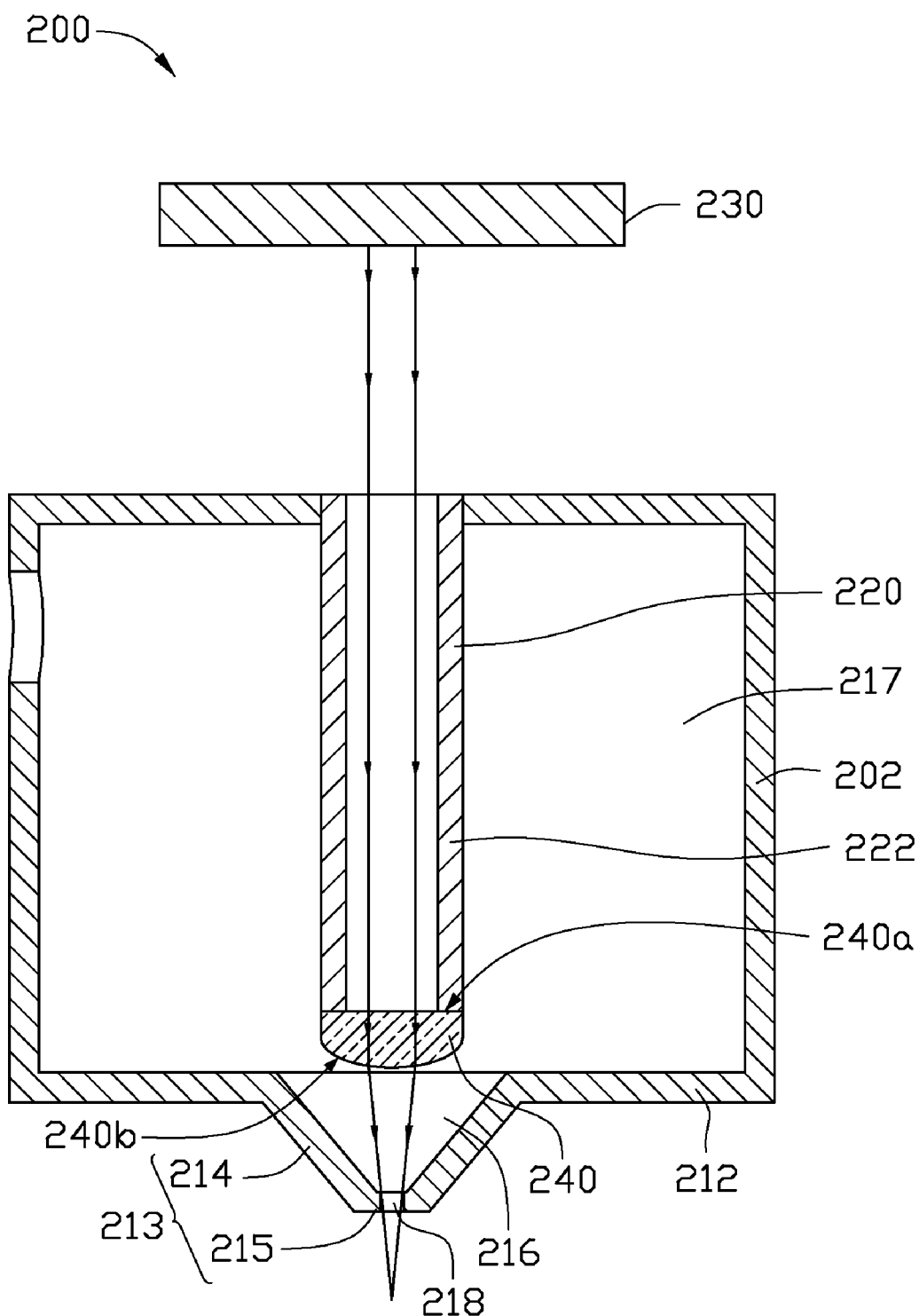
FIG. 3 is a sectional view of a water jet guided laser device, according to a second exemplary embodiment.

Referring to FIG. 3, a water jet guided laser device 200, according to a second exemplary embodiment, is shown. Differences between the water jet guided laser device 200 of this embodiment and the water jet guided laser device 100 of the first embodiment are that a water-ejecting device 202 and a converging lens 240 differ.

The water-ejecting device 202 includes a nozzle 213 protruding from the lower wall 212 and aligned with the light guide pipe 220. The nozzle 213 is substantially cone-shaped and includes a first connecting wall 214 and a second connecting wall 215. The second connecting wall 215 is substantially parallel to the lower wall 212. The first connecting wall 214 connects the lower wall 212 to the second connecting wall 215. The first connecting wall 214 and the second connecting wall 215 cooperatively define a sub water chamber 216. The sub water chamber 216 is in communication with the water chamber 217. The second connecting wall 215 has a water-ejecting through hole 218 defined therein. The light guide pipe 220 is corresponding to the nozzle 213.

In this embodiment, a transparent plate attached to an end surface of a second end 222 of the light guide pipe 220 is omitted. In stead, the converging lens 240 is water-tightly attached to an end surface of the second end 222 of the light guide pipe 220. In detail, the converging lens 240 includes a planar surface 240a and a convex surface 240b at opposite sides thereof. The planer surface 240a is water-tightly attached to the end surface of the second end 222 of the light guide pipe 220. The convex surface 240b faces the water-ejecting through hole 218.

The laser beam emitted from the laser source 230 is propagated through the light guide pipe 220 and then is converged and directed by the converging lens 240 into the nozzle 213. The converged laser beam is guided by the water jet to the workpiece through the water-ejecting through hole 218.

Advantages of the water jet guided laser device 200 of this second embodiment are similar to those of the water jet guided laser device 100 of the first embodiment.

It is to be understood, however, that even though numerous characteristics and advantages of the present embodiments have been set forth in the foregoing description, together with details of the structures and functions of the embodiments, the disclosure is illustrative only, and that changes may be made in detail, especially in matters of shape, size, and arrangement of parts within the principles of the disclosure to the full extent indicated by the broad general meaning of the terms in which the appended claims are expressed.

What is claimed is:

1. A water jet guided laser device, comprising:
   a water-ejecting device having a water chamber, a light incident through hole and a water-ejecting through hole defined at opposite sides thereof, the light incident through hole and the water-ejecting through hole being in communication with the water chamber, the water-ejecting device configured for ejecting water from the water chamber through the water-ejecting through hole, the light incident through hole configured for introducing a laser beam in the water chamber; and
   a hollow light guide pipe mounted in the water chamber and aligned with the light incident through hole and the water-ejecting through hole, the light guide pipe having a first end coupled to the light incident through hole and an opposite second end spaced from the water-ejecting through hole, the light guide pipe being watertight and configured for receiving and guiding the laser beam from the light incident through hole to the water-ejecting through hole.

2. The water jet guided laser device of claim 1, further comprising a laser source configured for emitting the laser beam to the light guide pipe.

3. The water jet guided laser device of claim 2, wherein the water-ejecting device comprises a container and a nozzle, the container comprising a cylindrical sidewall, an upper wall, and a lower wall formed at opposite sides of the cylindrical sidewall; the upper wall has the light incident through hole defined therein, the lower wall has a lower through hole defined therein; the light incident through hole aligned with the lower through hole; the laser source faces the upper wall; the nozzle is fixedly received in the lower through hole and has the water-ejecting through hole defined therein.

4. The water jet guided laser device of claim 3, further comprising a converging lens positioned between the upper wall and the laser source, the converging lens configured for converging and directing the laser beam to the light guide pipe.

5. The water jet guided laser device of claim 4, wherein an optical axis of the converging lens is aligned with a central axis of the light guide pipe.

6. The water jet guided laser device of claim 3, wherein the cylindrical sidewall comprises an inlet arranged therethrough, the inlet configured for introducing the water into the water chamber.

7. The water jet guided laser device of claim 6, wherein a diameter of the water-ejecting through hole is smaller than that of the inlet.

8. The water jet guided laser device of claim 1, wherein the light guide pipe further comprises a transparent plate water-tightly attached to an end surface of the second end to prevent water from entering the light guide pipe.

9. The water jet guided laser device of claim 1, wherein the water-ejecting device comprises a cylindrical sidewall, an upper wall, a lower wall, and a nozzle, wherein the upper wall and the lower wall are formed at opposite sides of the cylindrical sidewall; the upper wall has the light incident through hole defined therein; the nozzle protrudes from the lower wall and aligned with the light guide pipe and has the water-ejecting through hole defined therein, the water-ejecting through hole being in communication with the water chamber.

10. The water jet guided laser device of claim 9, further comprising a converging lens, wherein the converging lens is water-tightly attached to an end surface of the second end to prevent water from entering the light guide pipe and is configured for converging and directing the laser beam into the nozzle.

11. The water jet guided laser device of claim 10, wherein the converging lens comprises a planar surface and a convex surface at opposites sides thereof, the planar surface water-tightly attached to the end surface of the second end, the convex surface facing the nozzle.

12. The water jet guided laser device of claim 9, wherein the nozzle comprises a first connecting wall and a second connecting wall, the first connecting wall connecting the lower wall to the second connecting wall, the second connecting wall being substantially parallel to the lower wall, the first connecting wall and the second connecting wall cooperatively defining a sub water chamber in communication with the water chamber and the water-ejecting through hole, the second connecting wall having the water-ejecting through hole defined therein.

13. The water jet guided laser device of claim 9, wherein the cylindrical sidewall comprises an inlet arranged therethrough, the inlet configured for introducing the water into the water chamber.

14. The water jet guided laser device of claim 13, wherein a diameter of the water-ejecting through hole is smaller than that of the inlet.

* * * * *